(12) United States Patent
Tsimhoni et al.

(10) Patent No.: US 8,711,486 B2
(45) Date of Patent: Apr. 29, 2014

(54) SYSTEM FOR HIGHLIGHTING TARGETS ON HEAD UP DISPLAYS WITH NEAR FOCUS PLANE

(75) Inventors: Omer Tsimhoni, Herzliya (IL); Ronen Lerner, Binyamina (IL); Dehua Cui, Northville, MI (US); Thomas A. Seder, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 116 days.

(21) Appl. No.: 13/533,068

(22) Filed: Jun. 26, 2012

(65) Prior Publication Data
US 2013/0342913 A1 Dec. 26, 2013

(51) Int. Cl.
*G02B 27/14* (2006.01)
*G03H 1/00* (2006.01)
*G02B 27/01* (2006.01)

(52) U.S. Cl.
CPC .................................. *G02B 27/0172* (2013.01)
USPC ............................................. 359/630; 359/13

(58) Field of Classification Search
USPC ..................................................... 359/13, 630
See application file for complete search history.

(56) References Cited

U.S. PATENT DOCUMENTS 6,369,952 B1 * 4/2002 Rallison et al. ............... 359/630

* cited by examiner

*Primary Examiner* — William Choi

(57) ABSTRACT

Methods and apparatus for displaying a near-focus one-dimensional marker on a head up display (HUD) such that the parallax disparity between the marker and a distant far-focus visual target is not apparent to a viewer looking at the visual target through the HUD. The one-dimensional marker is oriented at the same angle as the interocular line of the viewer's eyes, as captured by a digital camera facing the viewer. Additionally, a dashed one-dimensional marker is disclosed to reduce the visual noticeability of small inaccuracies in orientation.

15 Claims, 5 Drawing Sheets

SYSTEM FOR HIGHLIGHTING TARGETS ON HEAD UP DISPLAYS WITH NEAR FOCUS PLANE

BACKGROUND

A head up display (HUD) for a viewer in a vehicle or comparable environment provides a transparent display through which the viewer sees visual targets in the environment. The HUD presents visual information and/or identifying markers which the viewer can see without having to divert the eyes from the visual targets seen through the HUD. This is particularly valuable when the viewer is a driver, pilot, co-pilot, navigator, crane operator, or other person with control responsibilities.

In some HUDs the visual information and/or identifying markers are virtual images, such as those reflected off the rear surface of a transparent pane (e.g., a vehicle windshield). In other HUDs the visual information and/or identifying markers are not images but rather are real object displays, such as those produced by a thin electronic display (e.g., a transparent liquid-crystal display).

For HUDs that produce real object displays, the objects are typically in the near-focus plane, in contrast to the visual targets seen through the HUD, which are typically in the far-focus plane. This is also the case for a subset of virtual image HUDs, where the reflected image is in the near focus plane. Near-focus HUDs thus introduce a parallax disparity with respect to the visual targets, as described below.

For an observed far-focus visual target, human binocular vision diverges the eyes according to the distance of the visual target, in accordance with the parallax of the visual target. A near-focus HUD highlighting marker, however, has a substantially different parallax from that of the far-focus visual target, resulting in a double image for the marker in the perceived unified binocular image, to which the viewer may not readily adapt, thereby reducing the visual effectiveness of the near-focus HUD. Currently, the only way to avoid this problem is to utilize HUDs with a reflected image in the far-focus plane, but this may restrict the HUD to span only a relatively small portion of the visual field, and may not be practical to use in certain situations. In addition, this may rule out the use of HUDs that utilize real object displays, which are typically in the near-focus plane.

SUMMARY

Embodiments of the present invention provide a one-dimensional near-focus HUD highlighting marker which extends parallel to the interocular line of the viewer's eyes, and thereby avoids the double image resulting from the parallax disparity.

In embodiments of the invention, one-dimensional markers extend linearly in the two-dimensional space of a near-focus HUD, with only enough thickness to be readily visible.

In an embodiment of the invention, solid straight lines are used as the one-dimensional highlighting markers to circumvent the double image problem.

In another embodiment of the invention, dashed straight lines are used as the one-dimensional highlighting markers, to further reduce the visual effect of residual double images caused by minor misalignment of the orientation of the highlighting markers with the interocular line of the viewer's eyes.

Therefore, according to an embodiment of the invention, there is provided a method for displaying, to a viewer, a marker on a head up display (HUD), the method including: measuring a viewer interocular line orientation relative to a predetermined reference line of the HUD; and displaying a one-dimensional marker having a marker orientation angle measured relative to the predetermined reference line of the HUD, wherein the marker orientation angle is substantially equal to the viewer interocular orientation angle.

In addition, according to another embodiment of the invention, there is provided an apparatus for controlling a head up display system, for displaying, to a viewer, a marker on a head up display (HUD), the apparatus including: a visual target identifier, for identifying a position of a visual target which the viewer is viewing through the HUD; a digital camera, for imaging the viewer's face; an eye location unit, for locating respective positions of the viewer's eyes; an interocular line orientation angle unit, for measuring the orientation angle of the viewer's eyes interocular line relative to a reference line of the HUD; and a marker display generator for controlling the HUD system to display a one-dimensional marker according to the position of the visual target, wherein an orientation angle of the one-dimensional marker relative to the reference line of the HUD is substantially equal to the orientation angle of the internocular line of the viewer's eyes relative to the reference line.

BRIEF DESCRIPTION OF THE DRAWINGS

The subject matter disclosed may best be understood by reference to the following detailed description when read with the accompanying drawings in which.

Figure 1:
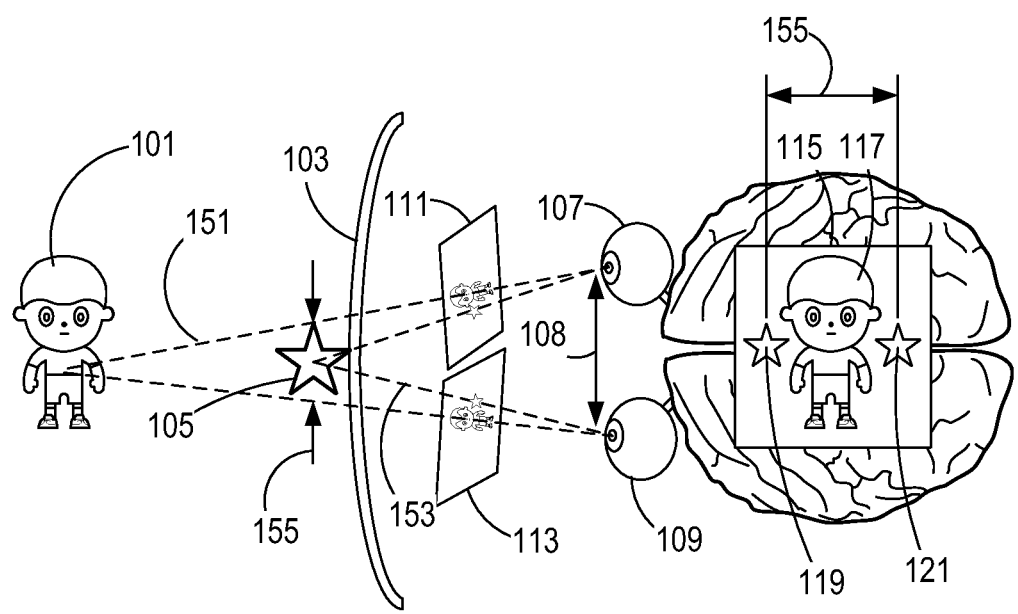
FIG. 1 illustrates the double image effect for a typical prior art near-focus HUD highlighting marker.

For simplicity and clarity of illustration, elements shown in the figures are not necessarily drawn to scale, and the dimensions of some elements may be exaggerated relative to other elements. In addition, reference numerals may be repeated among the figures to indicate corresponding or analogous elements.

DETAILED DESCRIPTION

FIG. 1 illustrates the double-imaging problem with a prior-art near-focus HUD marker. A viewer's right eye 107 and left eye 109 having an interocular distance 108 are focused on a visual target 101 through a windshield 103, on whose rear surface a reflected near-focus HUD marker 105 is positioned to indicate visual target 101. It is noted that in this non-limiting example HUD marker 105 is optically a virtual image, and because it is reflected off windshield 103, it will appear to be visually farther away than windshield 103.

Visual target 101 is far-focus, but HUD marker is near-focus. Because of a disparity between the parallax of visual target 101 and HUD marker 105 with respect to interocular distance 108, right eye 107 sees HUD marker 105 to the left of visual target 101 in a retinal image 111, whereas left eye 109 sees HUD marker 105 to the right of visual target 101 in a retinal image 113. Thus, when retinal images 111 and 113 are visually integrated, a combined perceived image 115 shows a single image 117 of visual target 101, but double images 119 and 121 of HUD marker 105.

Figure 2A:
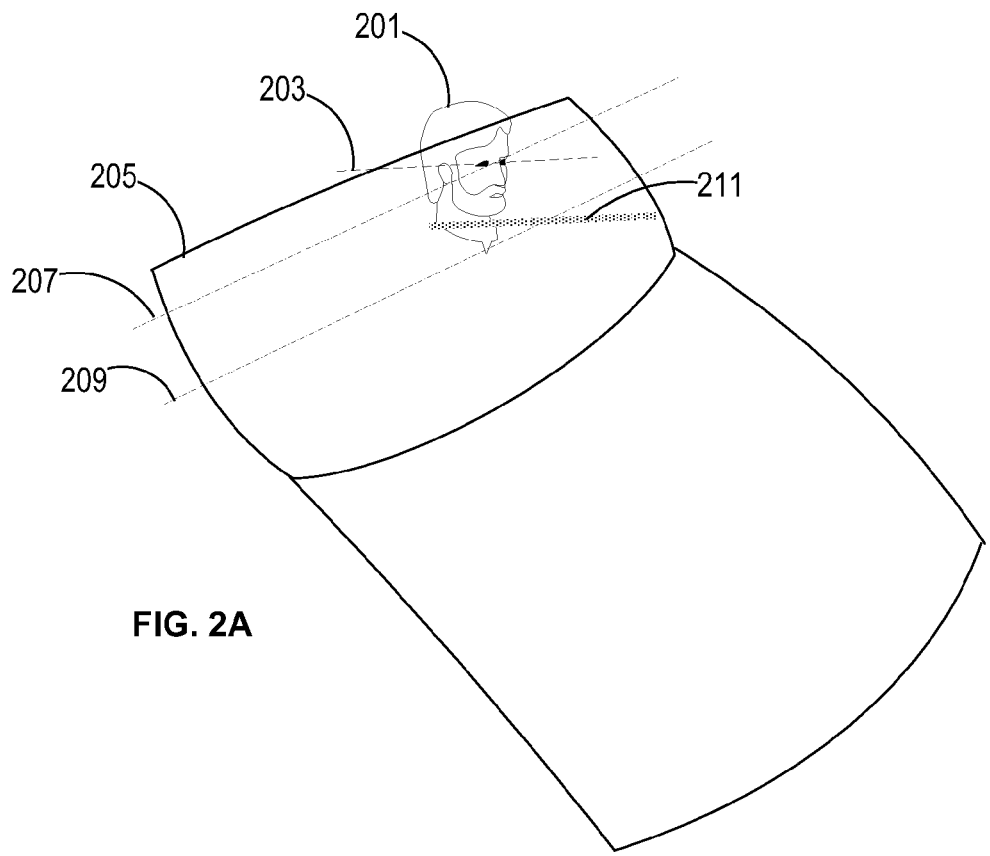
FIG. 2A and FIG. 2B illustrate aligning a one-dimensional HUD highlighting marker in parallel with the interocular line of the viewer's eyes, according to embodiments of the invention.

FIG. 2A illustrates the effects of an orientation of a viewer's head 201 resulting in an interocular line 203 of the viewer's eyes, which is oriented relative to a predetermined reference line associated with the HUD. In an embodiment of the invention, the HUD has a predefined reference line 209, and a secondary reference line 207 is parallel to reference line 209 of the HUD. In certain embodiments of the invention, predefined reference line 209 is horizontal relative to the vehicle. In another embodiment, secondary reference line 207 is parallel to an axis of a predefined coordinate system 225 associated with the HUD. In a further embodiment, secondary reference line 207 is adjusted to pass through the viewer's line-of-sight, and may be used as a reference line to measure the angle of the interocular line 203. According to embodiments of the invention, a one-dimensional reflected HUD marker 211 is substantially parallel to interocular line 203, which is not necessarily parallel to reference line 207.

Figure 2B:
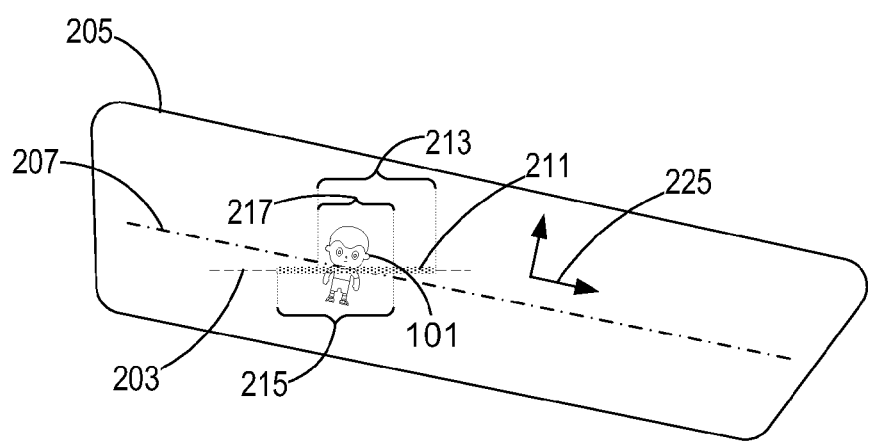

FIG. 2B illustrates the above relationships from the viewer's viewpoint, and also shows visual target 101 through windshield 205. HUD marker 211 is parallel to the interocular line 203, which is not necessarily parallel to reference line 207. As noted above, predetermined two-dimensional coordinate system 225 can equivalently be defined for the HUD, and orientation of interocular line 203 may be measured according to an angle relative to coordinate system 225. Even if not explicitly defined, a predetermined two-dimensional coordinate system is implicitly defined by a line reference, such as predefined reference line 209. The reference axes and reference lines shown in FIG. 2A and FIG. 2B need not be displayed in the HUD, however, and in certain embodiments of the invention, the reference axes and reference lines are not seen by the viewer.

HUD marker 211 is in the near-focus plane, whereas visual target 101 is in the far-focus plane, and therefore when the viewer's eyes are fixed on visual target 101, there necessarily must be a binocular vision parallax disparity that causes a double image of the HUD marker 211. However, because HUD marker 211 is one-dimensional and oriented parallel to interocular line 203, HUD marker 211 has translational symmetry so that the double images thereof are visually indistinguishable and appear to the viewer as a single image rather than as a double image. A segment 213 of HUD marker 211 is visualized by the viewer's left eye, and a segment 215 of HUD marker 211 is visualized by the viewer's right eye. A segment 217 of HUD marker 211 is visualized by both eyes.

In the example of the invention illustrated in FIG. 2B, HUD marker 211 is superimposed directly over the visual center of visual target 101 as shown.

Measuring orientation of the interocular line 203 involves only measuring the angle of the straight line connecting the viewer's eyes relative to a reference coordinate of the HUD projection apparatus. In examples of the invention, the HUD projection apparatus has a fixed predetermined orientation relative to the windshield, which in turn means that measuring orientation of the interocular line 203 involves only measuring the angle of the straight line connecting the viewer's eyes relative to windshield horizontal reference 207. This may be accomplished by known methods and apparatus which tracks the positions of the viewer's eyes (as discussed below). Although the eye positions must be tracked, this does not require tracking the gaze of the viewer (i.e., identifying what the viewer is looking at).

Avoidance of Non-Horizontal Marker Components

According to embodiments of the invention, it is preferable to avoid using markers that have an observable geometric component perpendicular to the viewer's interocular line. In other words, if the viewer's interocular line is considered "horizontal", then markers having a "vertical" component should be avoided. According to embodiments of the invention as detailed below, small deviations from the horizontal can be tolerated, but markers that are noticeably off-horizontal (e.g., diagonal, vertical) should be avoided.

In a similar manner, markers that do not have a sufficient horizontal extent, as detailed below, (e.g., a dot) should also be avoided.

Design of Markers to Account for Small Misalignments

Even though methods and apparatus for tracking the viewer's eye positions are well-established, it is possible that small inaccuracies in measuring the viewer's interocular line 203 may occur, and may thus result in small misalignments of HUD marker 211. A small misalignment in turn may result in a small vertical separation of the left- and right-eye visualizations of HUD marker 211, which may be perceived by the viewer as a double-vision bluffing of HUD marker 211.

According to an example of the invention, the HUD marker can be modified to account for a small misalignment, so that the misalignment is not visually apparent to the viewer.

Figure 3A:
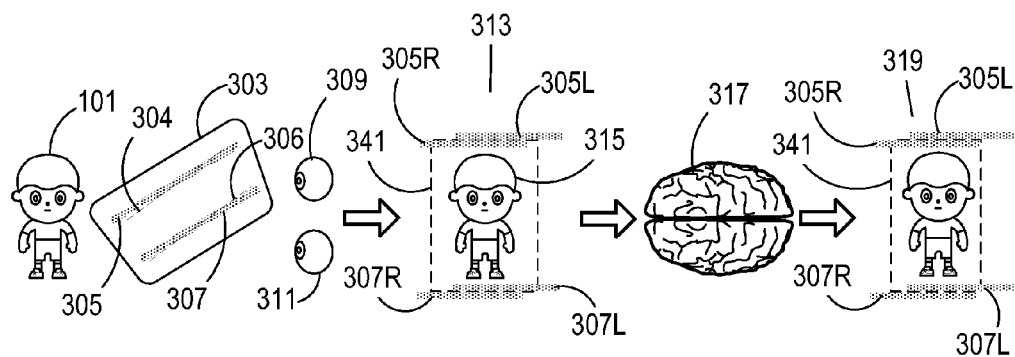
FIG. 3A illustrates a residual misalignment of one-dimensional line HUD markers.

FIG. 3A illustrates the effect of a small orientation misalignment of HUD markers 305 and 307 as reflected off a windshield 303. In this non-limiting example, the viewer's head (not shown) is tilted so that the interocular line of the viewer's eyes is parallel to the lines 304 and 306 on windshield 303. However, HUD markers 305 and 307 respectively are slightly misaligned in orientation, as shown in FIG. 3A.

As before, viewer's eyes 309 and 311 are on visual target 101, so that in a combined binocular image 313, image 315 appears as a single image of visual target 101. Because of the slight misalignment in orientation of HUD markers 305 and 307 relative to interocular line parallels 304 and 306, respectively, HUD marker 305 is imaged as a double image with an image 305L from left eye 311 and with an image 305R from right eye 309. Likewise, HUD marker 307 is imaged as a double image with an image 307L from left eye 311 and an image 307R from right eye 309. When visually processed by a low-level perceptual process 317, a perceived image 319 has the same double images of HUD markers 305 and 307, i.e., images 305L and 305R for HUD marker 305; and images 307L and 307R for HUD marker 307.

Figure 3B:
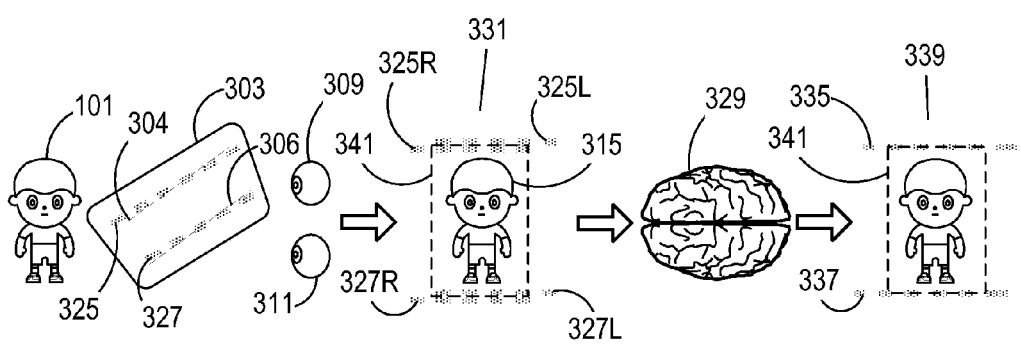
FIG. 3B illustrates compensating for residual alignment by using dashed one-dimensional line HUD markers according to an embodiment of the invention.

FIG. 3B illustrates the use of HUD markers 325 and 327, which have the same degree of slight misalignment as HUD markers 305 and 307 (FIG. 3A), but which are perceived differently, without the double image. The difference in perception is on account of the design of HUD markers 325 and 327, which comprise broken segments rather than a continuous whole. As in FIG. 3A, because of the slight misalignment in orientation of HUD markers 325 and 327 relative to interocular line parallels 304 and 306, respectively, HUD marker 325 is imaged as a double image with an image 325L from left eye 311 and with an image 325R from right eye 309. Likewise, HUD marker 327 is imaged as a double image with an image 327L from left eye 311 and an image 327R from right eye 309. However, provided that the misalignment in orientation is small, in a perceptual process 329 the broken segments of images 325R and 325L, and of images 327R and 327L may be subject to the gestalt effect, whereby the brain interprets images 325R and 325L as a whole rather than as disconnected parts, and images 327R and 327L likewise as a whole. Thus, a perceived image 339 has single images of HUD markers 335 and 337, without the double image effect.

Figure 3C:
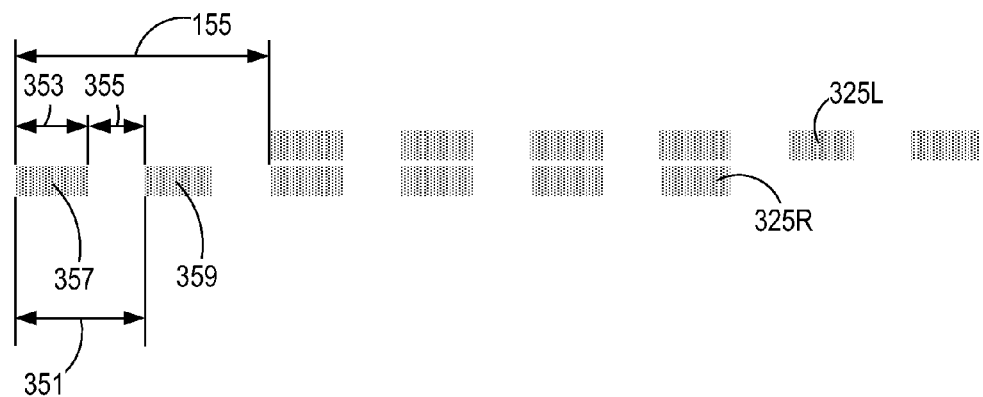
FIG. 3C illustrates geometric parameters of the dashed one-dimensional line HUD markers of FIG. 3B.

FIG. 3C illustrates the geometric parameters of segmented HUD marker 325 which must be properly adjusted in order for image 325R and 325L to be perceived as a single image in spite of the small misalignment.

With reference to FIG. 1, it is seen that parallax disparity of visual target 101 with respect to HUD marker 105 results from the different parallax of near-focus placement of HUD marker 105 from that of far-focus visual target 101, this disparity equals parallax disparity distance 155, as determined by triangles 151 and 153, which share a common base of interocular distance 108. Triangle 151 has sides pointing to visual target 101, and triangle 153 has sides pointing to HUD marker 325. Parallax disparity distance 155 (in FIG. 1) represents the width of triangle 151 at the visual distance of HUD marker 105.

A special case of interest occurs when visual target 101 (FIG. 1) is at an optical "infinity" point—where visual target 101 is sufficiently far away that the distance to visual target 101 is so much greater than interocular distance 108 that the sides of triangle 151 can be approximated as being substantially parallel. In the limiting case as the distance to visual target 101 goes to infinity, parallax disparity distance 155 approaches interocular distance 108. In such cases, parallax disparity distance 155 can be reasonably approximated as equal to intraocular distance 108 when the viewer is looking straight ahead. If the viewer's head is turned while the viewer continues to look straight ahead, intraocular distance 108 is appropriately foreshortened. In most cases of interest, however, intraocular distance 108 can be approximated as being constant.

According to an embodiment of the invention, a marker dash-to-dash distance 351 (in FIG. 3C) equals the distance from the start of a dash 357 to the start of an adjacent dash 359, and marker dash-to-dash distance 351 is set equal to parallax disparity distance 155 (in FIG. 1) divided by an arbitrary integer n, i.e., marker dash-to-dash distance 351 is a unit fraction (1/n) of parallax disparity distance 155. Arbitrary integer n may be chosen to optimize the visual appearance of dashed lines 335 and 337. In a non-limiting example shown in FIG. 3C, n=2.

A dash segment length 353 and a dash gap length 355 may be set arbitrarily provided that their sum equals marker dash-to-dash distance 351. In a non-limiting example of the invention, dash segment length 353 and dash gap length 355 are equal. In alternative representations, dash segment length 353 and dash gap length 355 may be represented as a ratio of one to the other or individually as percentages of marker dash-to-dash distance 351.

The setting of the above parameters is similar for segmented HUD marker 327.

In the example of the invention illustrated in FIG. 3B, HUD markers 325 and 327 are superimposed above and below, respectively, the top and bottom boundaries of visual target 101 as shown. In an embodiment of the invention, the top and bottom boundaries of visual target 101 are the top and bottom boundaries, respectively, of a bounding box 341 for visual target 101.

Method

Figure 4:
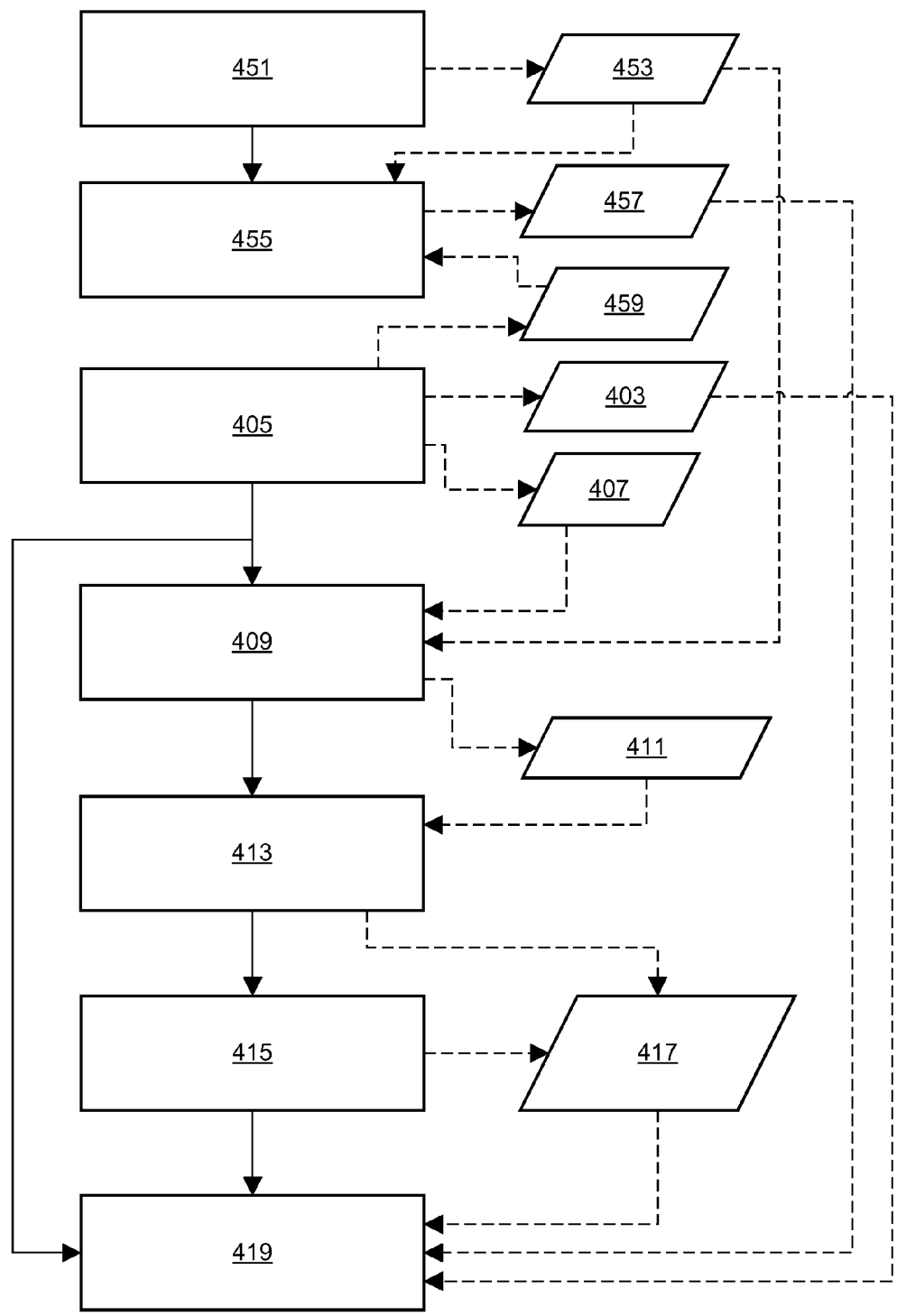
FIG. 4 illustrates a method for displaying a head up display marker according to embodiments of the invention.

FIG. 4 illustrates a method for displaying a head up display (HUD) marker according to an embodiment of the invention. In a step 451a visual target is detected, and the three-dimensional location of the visual target is stored as a target 3D location 453. Next, in a target-to-HUD projection step 455, a target 2D location 457 is stored. When it is desired to highlight the target with a marker according to embodiments of the invention, a step 405 measures a "horizontal" orientation relative to a reference line of the HUD and stores the measured value as a horizontal orientation angle 403. In subsequent steps a one-dimensional HUD marker is displayed with the same (or substantially the same) orientation angle as horizontal orientation angle 403. In a related embodiment the "horizontal" orientation is determined by measuring an interocular line 203 (FIG. 2A) relative to a predetermined reference line (such as reference line 207 in FIG. 2A); and in this embodiment horizontal orientation angle 403 is the angle between the reference line and the interocular line projected on the HUD plane. Also, as part of step 405, a location 459 of the viewer's eyes is stored, for use in step 455.

For a solid-line HUD marker according to certain embodiments of the invention, the method can proceed immediately to a step 419, in which the HUD marker is displayed with the same (or substantially the same) orientation angle relative to the predetermined HUD reference line as horizontal orientation angle 403.

For a dashed-line HUD marker according to further embodiments of the invention, in step 405 interocular distance 108 (FIG. 1) is also measured and stored as an interocular distance value 407.

Techniques for automatically measuring interocular line and interocular distance are well-known, such as via a digital camera with head pose detection software that can identify the positions of the viewer's eyes. From the digital camera image thus obtained, both viewer's interocular distance 108 (FIG. 1) and orientation of the interocular line 203 can be measured automatically. According to an embodiment of the invention, a digital camera is positioned to image the viewer's face from the direction in which the viewer would look to see the HUD. Then, should the viewer's head be turned, the applicable foreshortening of the viewer's interocular distance will be imaged, so that no correction to account for the foreshortening is needed.

For a dashed-line HUD marker according to other embodiments of the invention, the method proceeds to a step 409 in which a parallax disparity distance 155 (FIG. 1) is calculated as previously described, based on triangular measurements such as those illustrated in FIG. 1. Then the measured value of parallax disparity distance 155 is stored as a parallax disparity distance value 411. This step requires the range to the target, or assumes this range is large enough to be treated optically as infinity.

In a step 413 dash-to-dash distance 351 (FIG. 3C) is calculated and the value is stored in a dash parameter storage 417. In a step 415, the remaining dash parameters, namely dash segment length 353 and dash gap length 355 (FIG. 3C) are set and similarly stored in dash parameter storage 417.

For a dashed line marker, step 419 completes the process by displaying the marker on the HUD, using the dash parameters stored in dash parameter storage 417 as well as horizontal orientation angle 403.

A further embodiment of the present invention provides a computer product for performing the foregoing method, or variants thereof.

A computer product according to this embodiment includes a set of executable commands for performing the method on a computer, wherein the executable commands are contained within a tangible computer-readable non-transient data storage medium including, but not limited to: computer media such as magnetic media and optical media; computer memory; semiconductor memory storage; flash memory storage; data storage devices and hardware components; and the tangible non-transient storage devices of a remote computer or communications network; such that when the executable commands of the computer product are executed, the computer product causes the computer to perform the method.

In this embodiment, a "computer" is any data processing apparatus for executing a set of executable commands to perform a method of the present invention, including, but not limited to: a processor; embedded controller; or any other device capable of executing the commands.

Apparatus

Figure 5:
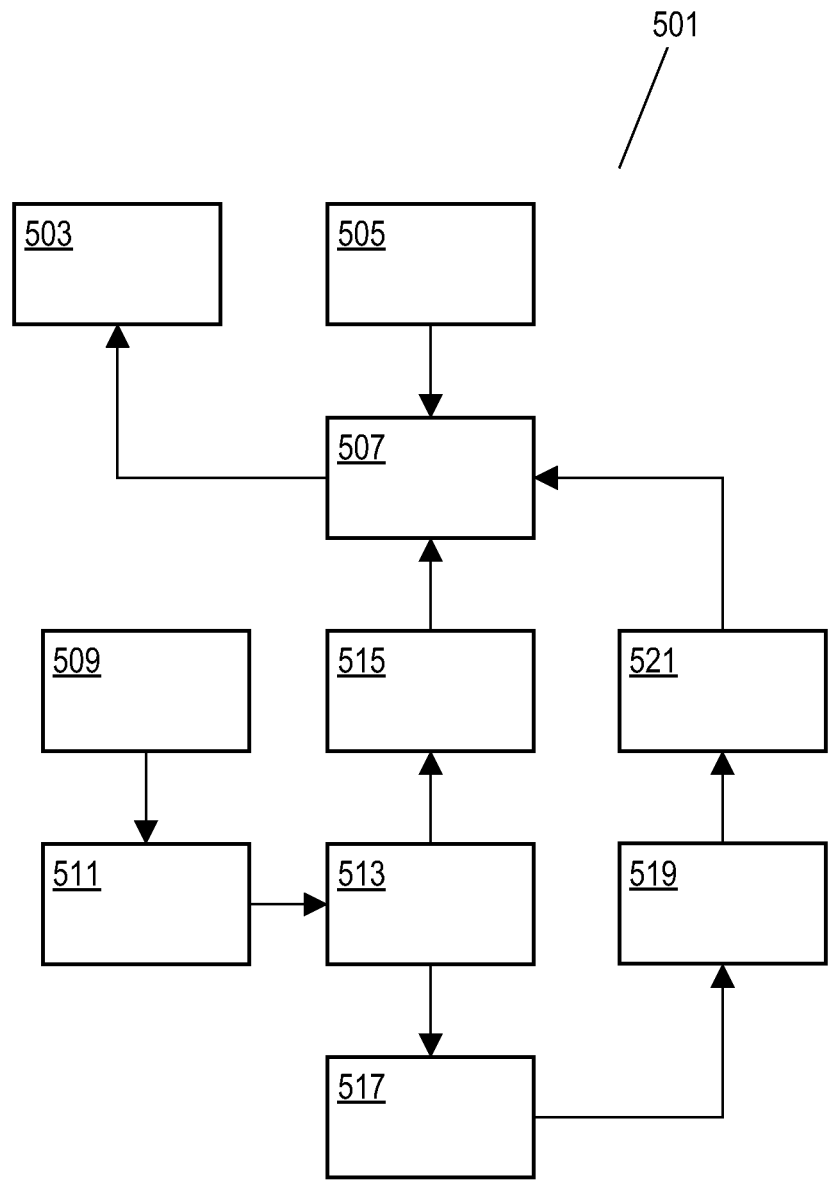
FIG. 5 illustrates a conceptual block diagram of apparatus for displaying a head up display marker according to embodiments of the invention.

FIG. 5 illustrates a conceptual block diagram of apparatus 501 for controlling a head up display system 503 to display a head up display marker according to embodiments of the invention.

A head up display (HUD) system 503 displays information and markers for a viewer viewing a far-focus visual target (not illustrated). A unit 505 identifies and locates the apparent visual position and extent of the visual target relative to the HUD seen by the viewer.

A digital camera 509 faces the viewer and captures an image of the viewer's face, which is recognized as a human face by a face detection unit 511. An eye location unit 513 locates the positions of the viewer's eyes, and outputs the positions to horizontal orientation unit 515, which determines a horizontal orientation angle for a one-dimensional marker. In a related embodiment of the invention, horizontal orientation unit 515 measures the angle of the viewer's interocular line relative to a reference line in the HUD via digital camera 509. Horizontal orientation unit 515 outputs the horizontal orientation angle to a one-dimensional marker display generator 507.

One-dimensional marker display generator 507 then inputs commands to HUD projection system 503 to display a one-dimensional marker at one or more positions within the HUD according to the location and extent of the visual target as determined by visual target identifier 505, wherein the orientation angle of the one-dimensional marker relative to the reference line in the HUD is substantially equal to the horizontal orientation angle, which in the related embodiment of the invention, as previously detailed, is the orientation of the viewer's interocular line relative to the reference line.

In an additional embodiment of the invention, an interocular distance measuring unit 517 obtains eye position data from eye location unit 513 and sends the viewer's interocular distance to a parallax disparity calculator 519. The calculated parallax disparity is then sent from parallax disparity calculator 519 to a dash parameter calculator 521, which computes dash parameters, as previously described, including the dash-to-dash distance. When dash parameter calculator 521 sends the dash parameters to marker display generator 507, marker display generator sends commands to HUD projection system 503 to display a dashed one-dimensional marker at one or more positions within the HUD according to the location and extent of the visual target as determined by visual target identifier 505.

What is claimed is:

1. A method for displaying, to a viewer, a marker on a head up display (HUD), the method comprising:
   determining a horizontal orientation angle relative to a predetermined reference line of the HUD; and
   displaying a one-dimensional marker having a marker orientation angle measured relative to the predetermined reference line of the HUD, wherein the marker orientation angle is substantially equal to the horizontal orientation angle.

2. The method of claim 1, wherein the determining the horizontal orientation angle is performed by measuring a viewer interocular line relative to a predetermined reference line of the HUD.

3. The method of claim 1, wherein the one-dimensional marker is a solid line.

4. The method of claim 1, wherein the one-dimensional marker is a dashed line.

5. The method of claim 4, wherein the viewer is viewing a visual target having a parallax disparity with respect to the dashed line, and further comprising:
   calculating a parallax disparity distance of the parallax disparity; and
   setting a marker dash-to-dash distance of the dashed line to a unit fraction of the parallax disparity distance.

6. Apparatus for controlling a head up display system, for displaying, to a viewer, a marker on a head up display (HUD), the apparatus comprising:
   a visual target identifier, for identifying a position of a visual target which the viewer is viewing through the HUD; and
   a marker display generator for controlling the HUD system to display a one-dimensional marker according to the position of the visual target, wherein an orientation angle of the one-dimensional marker relative to a reference line of the HUD is substantially equal to an orientation of an interocular line of the viewer's eyes relative to the reference line.

7. The apparatus of claim 6, further comprising:
   a digital camera, for imaging the viewer's face; and
   an eye location unit, for locating respective positions of the viewer's eyes and determining an interocular line orientation relative to a reference line of the HUD
   wherein the horizontal orientation angle unit determines the horizontal orientation angle according to the interocular line.

8. The apparatus of claim 7, wherein the one-dimensional marker is a solid line.

9. The apparatus of claim 7, wherein the one-dimensional marker is a dashed line.

10. The apparatus of claim 7, further comprising:
    an interocular distance unit, for measuring an interocular distance of the viewer;
    a parallax disparity calculator for calculating the a parallax disparity distance; and
    a marker dash parameter calculator for calculating a dash-to-dash distance of the dashed line according to the parallax disparity distance.

11. A computer product for a computer controlling a head up display system, for displaying, to a viewer, a marker on a head up display (HUD), the computer product comprising a set of executable commands contained within a tangible computer-readable non-transient data storage medium, such that when the executable commands of the computer product are executed, the computer product causes the computer and the head up display system to:
    determine a horizontal orientation angle relative to a predetermined reference line of the HUD; and
    display a one-dimensional marker having a marker orientation angle measured relative to the predetermined reference line of the HUD, wherein the marker orientation angle is substantially equal to the horizontal orientation angle.

12. The computer product of claim 11, further comprising additional executable commands, which, when executed, cause the computer and the head up display system to measure an orientation of a viewer interocular line relative to a predetermined reference line of the HUD and to determine the horizontal orientation angle according to the viewer interocular line.

13. The computer product of claim 11, wherein the one-dimensional marker is a solid line.

14. The computer product of claim 11, wherein the one-dimensional marker is a dashed line.

15. The computer product of claim 14, wherein the viewer is viewing a visual target having a parallax disparity with respect to the dashed line, and further comprising additional executable commands, which, when executed, cause the computer and the head up display system to calculate a parallax disparity distance of the parallax disparity; and set a marker dash-to-dash distance of the dashed line to a unit fraction of the parallax disparity distance.

* * * * *